Aug. 12, 1930.                A. O'BRIEN                 1,773,058
                           WIRE WORKING TOOL
                          Filed April 25, 1929
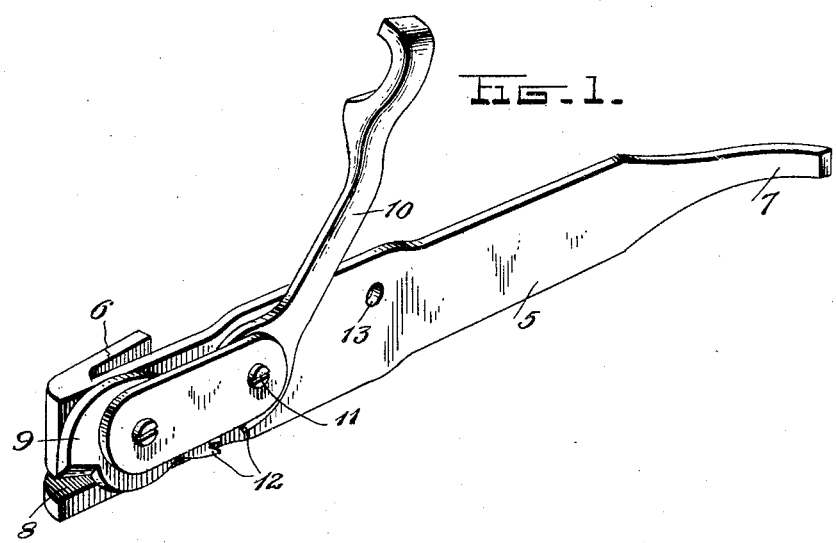
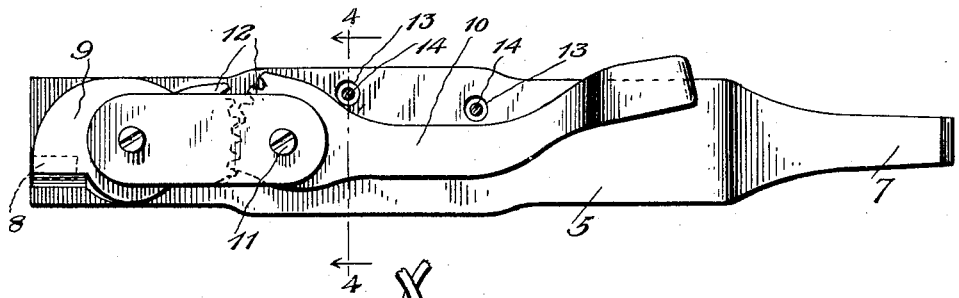
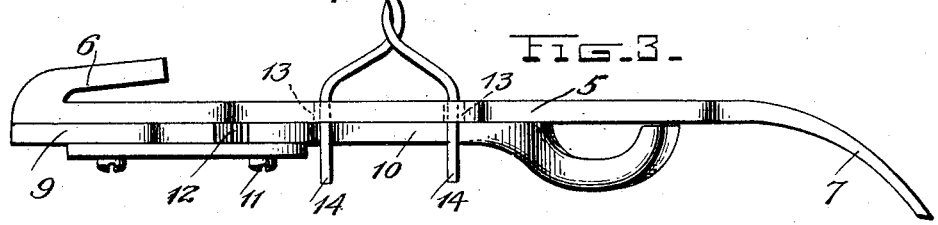
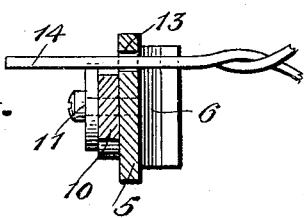
Inventor
Anson O'Brien Patented Aug. 12, 1930

1,773,058

UNITED STATES PATENT OFFICE

ANSON O'BRIEN, OF VIOLA, ILLINOIS

WIREWORKING TOOL

Application filed April 25, 1929. Serial No. 358,093.

The invention relates to a new and improved tool designed primarily for twisting and cutting wires used in the erection of forms for cement work. Among other features of construction, the tool embodies a shank having two spaced openings through which to pass the ends of wires to be twisted together, and a wire cutter having an operating lever at one side of said shank, and it is the primary object of the invention to so mount said lever that it must swing across said openings to move to cutter-open position. Hence, when the openings are occupied with wire ends to be twisted together, said wire ends will prevent the lever from so moving as to open the cutter and consequently there is no danger of the operator being injured by the cutter and the lever is held against outward swinging from the shank and interfering with proper manipulation of said shank to perform the wire twisting operation.

Another object is to provide a construction which is exceptionally simple and inexpensive, yet is efficient and in every way desirable.

With the foregoing in view, the invention resides in the novel subject matter hereinafter described and claimed, description being accomplished by reference to the accompanying drawing.

Fig. 1 is a perspective view.

Fig. 2 is a side elevation illustrating two wire ends in the twisting openings of the shank.

Fig. 3 is an edge elevation showing the wires in the openings.

Fig. 4 is a transverse sectional view on line 4—4 of Fig. 2.

In the drawing above briefly described, the numeral 5 denotes a flat elongated shank having a wire twisting hook 6 at one end and a wire twisting tongue 7 at its other end, the hook-equipped end of the shank being provided with a notch 8 with which a movable wire cutter 9 is operatively associated. A lever 10 is fulcrumed at 11 to one side of the shank 5 for operating the cutter 9, the operative connection between lever and cutter preferably consisting of intermeshing teeth 12 so related that they limit the movement of the lever 10 in either cutter-opening or cutter-closing direction. When this lever is in cutter-closed position, it extends longitudinally of the shank 5. Two openings 13 are formed through this shank to receive the ends 14 of wires to be twisted together, said openings being so positioned that the lever 10 must swing across them in moving from the cutter-closed position of Fig. 2 to the cutter-open position of Fig. 1. Hence, when the wire ends 14 are in the openings 13 and the tool is being used for twisting said ends together as seen in Figs. 2 and 3, these ends prevent the lever 10 from outwardly swinging to cutter-open position. Consequently, there is no danger of the operator being injured by the cutter and the lever 10 cannot outwardly swing and interfere with proper manipulation of the tool during the wire twisting operation.

It may be stated that I make no attempt herein to obtain protection on the mere bringing together of a number of old features of construction in a single device. However, the relation of the openings 13 with the cutter-closed position of the lever 10 whereby the wire ends received in said openings will lock the lever against movement to cutter-open position, is a new and advantageous relation and constitutes the gist of the invention.

The details disclosed are preferably followed, but within the scope of the invention as claimed, variations may be made.

I claim:

A wire working tool comprising a shank having two spaced transverse openings through which to pass the ends of wires to be twisted together, a cutter mounted on said shank and a cutter-operating lever mounted for movement across said openings to cutter-open position; whereby when said openings are occupied with wire ends to be twisted, said ends prevent said lever from moving to cutter-open position.

In testimony whereof I have hereunto affixed my signature.

ANSON O'BRIEN.